April 28, 1964  A. G. BODINE, JR  3,130,552
METHOD AND APPARATUS FOR CREATING A LOAD
BEARING REGION IN EARTHEN MATERIAL
Filed March 28, 1961  3 Sheets-Sheet 2
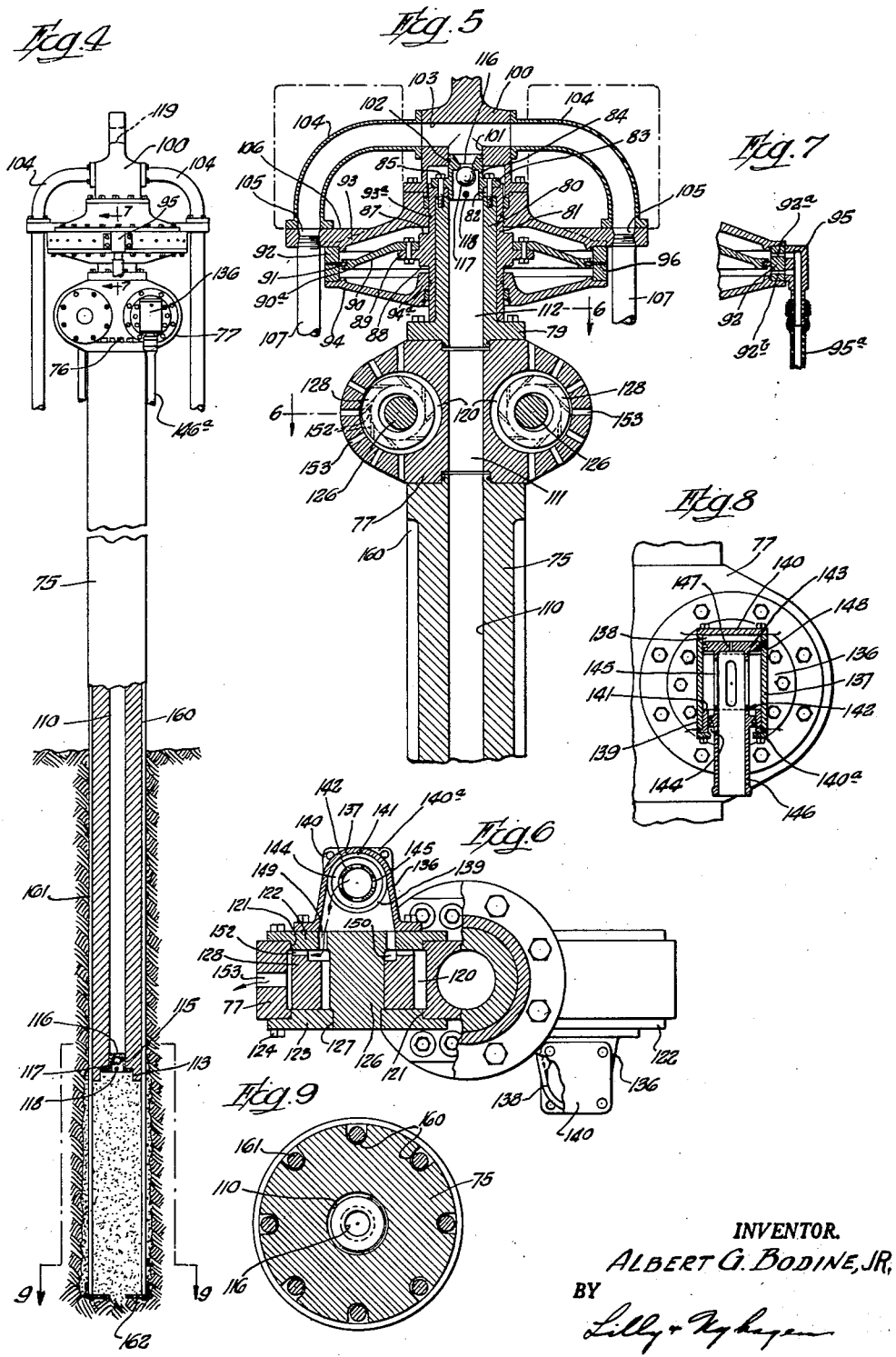
INVENTOR.
ALBERT G. BODINE, JR,
BY

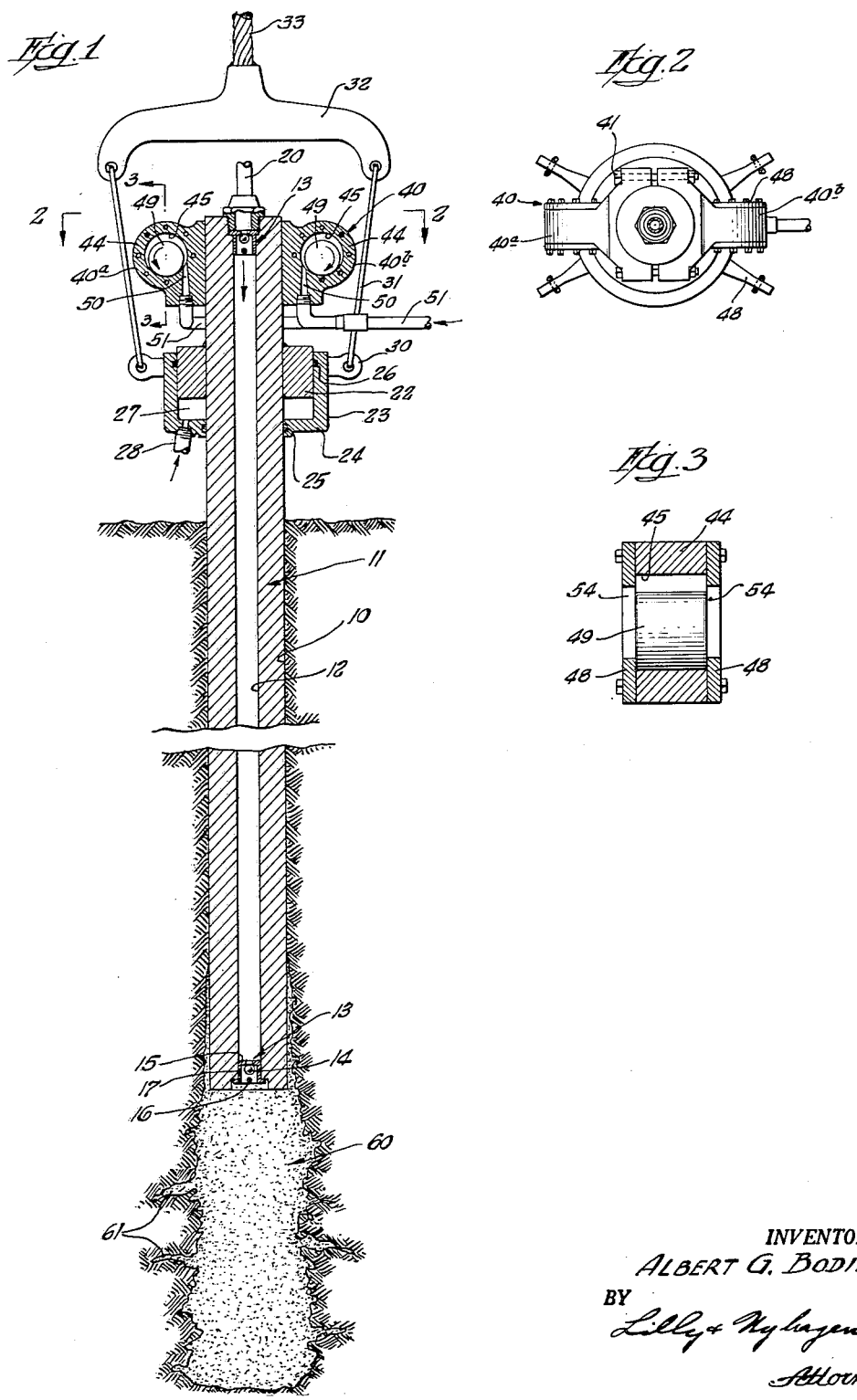
INVENTOR.
ALBERT G. BODINE, JR.
BY
Lilly & Nyhagen
Attorneys.

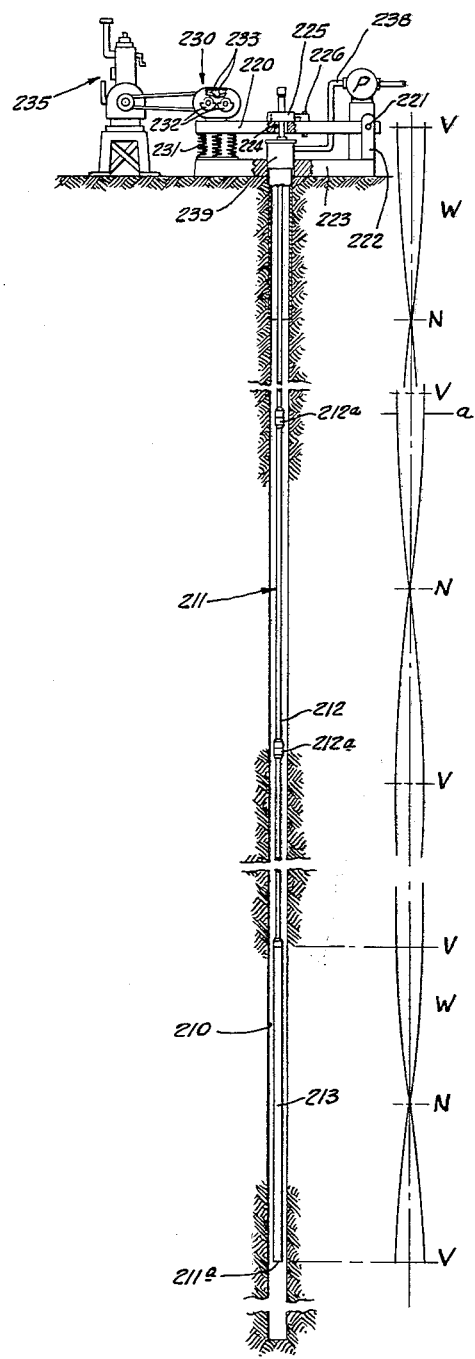
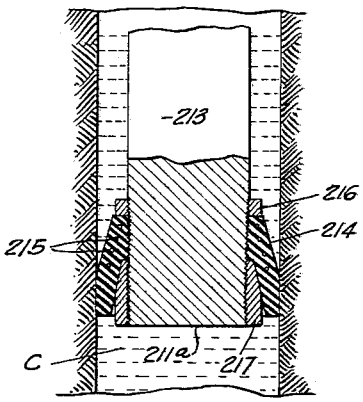

United States Patent Office 3,130,552
Patented Apr. 28, 1964

3,130,552
METHOD AND APPARATUS FOR CREATING
A LOAD BEARING REGION IN EARTHEN
MATERIAL
Albert G. Bodine, Jr., Sherman Oaks, Calif.
(7877 Woodley Ave., Van Nuys, Calif.)
Filed Mar. 28, 1961, Ser. No. 98,801
7 Claims. (Cl. 61—36)

This invention relates generally to methods of and apparatus for creating in the earth localized regions or bodies of differentiated material, such as of increased compactness, density, and/or hardness, for such typical purposes as providing foundations or other reinforcing supports for building structures, roads, launching pads, or of unconsolidated sand for purpose of soil drainage. Other examples of the invention involve the injection of soil solidifying chemicals, plastics, or the like.

The invention relates more particularly to the accomplishment of such objectives by injecting a foreign material into the earth aided by sonic wave activity. Materials to be injected may be such as cement slurry, freshly mixed concrete, soil solidifying chemicals or plastics, loose sand, or others, depending upon the application at hand.

In accordance with an illustrative practice of the invention, a material injector, in the form of an elongated elastic rod or stem, is inserted into the earth, e.g., into a previously prepared cavity or earth bore.

This injector stem is formed to define a conduit for the materials to be injected. Sonic elastic waves are set up in the injector stem, and these waves are transmitted into the surrounding soil. The soil, under the influence of these waves becomes actively fluidized, compacts, and freely accepts a large amount of the material from the injector.

As one example, assume that a bore has been made into ground surface soil. A cylindrical injector stem composed of a good elastic material, such as steel, and fitting this earth bore fairly closely, is then inserted therein. This stem may have a longitudinal feed bore therethrough for the materials to be injected. A sonic wave generator coupled to the elastic stem sets up elastic waves therein, and these waves are radiated to and into the earth from all surfaces of the stem. The material fed to the earth bore through the injector stem may be, for example, a cement slurry, and this material first fills in the space between the stem and the bottom of the bore, and any space between said stem and the side walls of the bore. This latter material seals to the earth bore walls, and tends to fill in any cyclically recurring space along the stem owing to cyclic expansion and contraction of said stem in its sonic wave action. The injected material, thus confined, is cyclically driven against the walls of the bore hole below the stem by the sonic wave action of the stem, as will be more fully explained later. The previously mentioned sonic waves radiated from the stem into the soil are transmitted to the soil via the intervening cement material, the cement impacting against the soil by its wave action. The cement slurry is highly compacted, and helps match the moderate impedance of the soil to the higher impedance of the injector stem.

The effect of the sonic waves transmitted to and through the soil around the bore hole is to fluidize it, i.e., break it into fine particles and impart to it a mobility, such that it is free to flow, almost as a liquid. The sonically injected cement slurry, cyclically driven against the thus fluidized surrounding soil, drives the soil back and compacts it. Voids within the original soil structure are filled by the fluidized soil, and a general compaction is accomplished.

A body of the injected material is thus formed in the bore hole, and extends outside the radial limits of the original bore hole depending upon the soil compaction obtained. Some of this injected material fingers its way into the surrounding soil, filling voids therein, and contributing to further compaction.

When the injected material has set and hardened, there results a solid implanted body, of a diameter usually somewhat larger than the bore hole, depending upon the recession and compaction of the soil. Where the original soil is soft and easily compacted, the cement body fills out to a greater radial dimension than where the original soil is harder. The general outline of the cement body thus conforms to the "hardness contour" of the soil. The implanted body comprises generally a core region of pure cement, and a shell of mixed soil and cement, the proportion of cement lessening in the radially outward direction. On the outside of this implanted body there will sometimes (depending upon local soil conditions) be out-reaching "fingers" of the injected material which have been thrust outward into the soil. Such fingers taper off, and it will be seen that the proportion of cement to soil gradually decreases deeper and deeper into the soil. These fingers aid in anchoring the body of cement, somewhat in the manner of the roots of a tree.

In one practice of the invention, the injector is gradually elevated as the cement is discharged, so as to fill the bore hole toward or to the ground surface, and thus, in effect, build a column of cement or concrete which may serve as a pile.

Certain materials, such as concrete, are compacted to an unusual extent owing to the sonic wave action or vibration, and the solidified body, implanted in accordance with the invention, accordingly has improved density, hardness, and overall strength.

The invention will be further understood from the following detailed description of certain illustrative embodiments thereof, reference being had to the accompanying drawings, in which:

FIG. 1 is a longitudinal sectional view showing a sonic injector in accordance with the invention, in course of performance in accordance with the invention;

FIG. 2 is a view taken in accordance with line 2—2 of FIG. 1;

FIG. 3 is a detail section taken on line 3—3 of FIG. 1;

FIG. 4 is a view showing a modified form of sonic injector, partly in elevation and partly in longitudinal section, shown situated in a bore hole in the ground;

FIG. 5 is a longitudinal sectional view of the upper end portion of the sonic injector of FIG. 4;

FIG. 6 is a transverse section taken on broken line 6—6 of FIG. 5;

FIG. 7 is a detail sectional view taken on line 7—7 of FIG. 4;

FIG. 8 is a section taken on line 8—8 of FIG. 6;

FIG. 9 is a section taken on line 9—9 of FIG. 4;

FIG. 10 is an elevational view of another embodiment of the invention shown in operation in a bore hole in the earth;

FIG. 11 is an enlarged detail partly in section, showing the use of a flexible cup on the lower end of the apparatus of FIG. 10.

Referring first to FIGS. 1-3 of the drawings, numeral 10 designates an earth bore which has been made in the ground, using any suitable boring apparatus, and numeral 11 designates a tubular elastic injector stem or rod, shown lowered into bore 10, which it fits fairly closely. This stem 11 is of a length governed by the depth in the ground at which injection is to begin, and, for purpose of construction of a foundation column, or pile, may typically be of a length of say 40 feet. Its diameter may vary widely for different applications, but for the case given, may be typically 10 inches.

A central materials feed bore 12 extends longitudinally through stem 11, and mounted therein are one or more check valves 13, arranged to pass fluid in a downward direction. As here shown, each check valve comprises a valve ball 14 adapted to seat upwardly on a seat ring 15, and confined by suitable cage means, here in the form of a cross pin 16 fitted across valve sleeve 17.

A material feed hose 20 is coupled to the upper end of stem 11, so as to feed the bore 12, and will be understood to lead from a suitable source of fluid material, such as a materials pump, not shown.

Near its upper end, stem 11 is provided with an external piston 22, which works in an air cylinder 23, having a bottom wall 24 slidably surrounding and pressure sealed, as at 25, to the stem 11. The piston 22 is air-sealed to cylinder 23, as at 26. The cylinder space 27 below piston 22 is supplied with air under pressure via an air hose 28. The air pressure maintained in space 27 is sufficient to act as an air spring for support of the stem 11 and auxiliary equipment connected thereto.

Cylinder 23 has a pair of eyes 30 suspended through links 31 from the arms of a hanger 32 hung, in turn, by means of a cable 33, from any suitable lowering and hoisting gear such as is conventionally used in connection with derricks, cranes, etc., not shown.

A sonic wave generator 40 is coupled to the upper end of the stem 11. In this instance, the generator 40 is in two parts 40a and 40b secured rigidly against opposite sides of the upper end of the stem 11 by bolts 41. It will be understood that these parts 40a and 40b co-act through the upper end of stem 11 so as to act as a unitary wave generator. The type of wave generator used and its operation are disclosed in my prior Patent No. 2,960,314. Each of members 40a and 40b comprises a housing embodying a cylindrical wall 44 forming a circular raceway 45. Two side plates 48 engage opposite edges of each circular side wall 44, and form with wall 44 a circular chamber in which is confined a generally cylindrical inertia rotor 49. The rotor 49 is of a diameter substantially smaller than that of the raceway 45, and is adapted to roll therearound in an orbital path, exerting a centrifugal force on the wall 44. The rotor 49 is driven in this fashion by a jet of air under pressure introduced tangentially of the raceway via a nozzle bore 50 supplied by pressure air hose 51. Spent air escapes via ports 54 in side plates 48.

It will be seen from FIG. 1 that the two inertia rotors are driven in opposite directions of rotation. As will presently be described, the two rotors are phased to run in synchronism with one another. That is to say, they are always at corresponding points of their respective orbital paths. Thus they move up and down together and, by virtue of their opposite directions of orbital motion, they move laterally in opposition to one another. Accordingly, the vertical components of the force exerted by the rotors on the generator housings, and thence on the stem 11, are in phase and additive; while the horizontal force components are equal and opposite and cancel. The air pressure driving the rotors is made such that the number of circuits per second taken by the rotors around their raceways is in the range of the resonant frequency of the stem 11 for a mode of longitudinal standing wave vibration of the stem, usually the half wavelength mode. Assuming the half wavelength mode, a standing wave is characterized by the two half length portions of the stem alternately elastically elongating and contracting with the mid-point of the stem experiencing a velociy node of the standing wave, i.e., standing substantially stationary, and the two end portions experiencing velocity antinodes, i.e., vibrating in directions longitudinal of the rod at maximum amplitude.

At first, the two rotors 49 have random phase relations. Very shortly, they chance to come into such phase relations as to cooperate, or be additive, to a degree in vertical motion (longitudinally of the rod). When that occurs, a component of vertically oscillating force is exerted on the generator housing, and therefore on the upper end of stem 11, and if the frequency is in the range of fundamental resonance, the stem will vibrate, possibly only feebly at first, in an approximation to the desired half wave standing wave mode. Once this process is started, the resonantly vibrating stem tends to vibrate at a frequency just under peak resonance frequency for the stem; and this controlled vibration of the stem back-reacts on the rotors to hold them both at the frequency of vibration of the stem, and to bring them into synchronism with each other. As they synchronize, the amplitude of the standing wave increases to maximum.

Operation is as follows: The bore 10 is formed in the ground, as by us of any suitable earth boring apparatus. The stem 11 is then lowered into this bore, as to a position a few feet, for example, above the lower end of the bore 10, as indicated in FIG. 1. A pump, not shown, preferably a continuous flow pump, is connected on its intake side to a source of cement slurry, and on its discharge side to feed hose 20, and pressurized air is delivered through hoses 51 to sonic wave generator, setting stem 11 into half wave standing wave vibration as earlier explained.

The check valves 13 in the bore 12 of vibrating stem 13 then act to pump the cement slurry downwardly through said bore 12 to be discharged at the lower end of stem 11 into the lower end portion of earth bore 10. The pumping action is set forth in my Patent No. 2,444,912, the only difference being that in the patent, the check valves open upwardly, and the liquid is pumped upwardly. Here, the check valves open downwardly, and pumping is in the downward direction. Briefly, on each upward movement of a check valve ball seat ring, fluid immediately above the ring is displaced by the latter, and moves through the ring by momentary suction from below the ring owing to the elevation of the ring. The ball is at this time unseated. In other words, a void created below the ring as the ring rises is filled with fluid owing to fluid above the ring being displaced by the ring. On the downstroke, the ring, moving with an acceleration greater than gravity, seats against the check valve ball, and the fluid is propelled downwardly. Springs, not shown, may be used to bias the check valve balls to seat normally on the seat rings.

The cement slurry thus pumped through stem 11 fills in the bore 10 below the stem, and rises in any narrow crevice between the stem and the wall of the bore hole, sealing that space. The portions of the vibrating stem 11 contacting the injected body 60 of cement slurry and the walls of the bore hole radiate sonic waves which travel through the body of cement slurry to and through the surrounding soil. The cement slurry has an impedance intermediate that of the stem and that of the soil, and helps match the two for effective transmission of sonic energy.

It will be seen that the cement slurry is injected into the bore 10 in sonic frequency pulses. These pulses and intermittent compactions, acting together, impact against the surrounding soil, and together with the sonic waves radiated from the stem and transmitted to and through the soil, operate to fluidize and compact the soil, as described in the introductory portion of this specification. In addition, the piston-like action of the lower end of the stem acts, on each downstroke, to compact the slurry already in the bore hole and to force it radially outwards against the walls of the bore hole. The cement slurry follows up the compacting and receding soil, the diameter of the injected body 60 thus being greater than that of the original bore hole, to an extent, of course, depending upon the original hardness of the formation. The fluidized pulverizing and compacting soil also tends to receive fingers or runners of the slurry, such as suggested at 61; and these, when the cement has set, aid in anchoring the implanted body.

It may be desired merely to implant a body, such as shown at 60 in FIG. 1, at some location beneath the ground surface. An alternative practice of the invention, however, is to build the body 60 up to the level of the ground surface, so as to become, in effect, a pile. This is done by gradually hoisting the stem 11 out of the bore hole as the cement slurry is being injected, raising the stem slowly enough to assure desired soil compaction. Of course, if the stem were to be elevated too rapidly, there would result merely the filling of the bore hole. This may be sufficient for some applications of the invention, but the compaction of the soil, and the forcing of the injected material against and into the soil, is an important practice of the invention, and requires that the stem 11 be elevated slowly enough to accomplish the stated purpose.

In an alternative practice of the invention, a hole for the injector stem is not preliminarily bored, but is made by the injector stem itself. The lower end of the stem is simply rested on the earth, and the vibration generator means driven, so as to resonate the stem. The stem buries itself by sonic standing wave action, it being recalled in this connection that the lower half portion of the stem is undergoing alternating elastic elongation and contraction, and that the lower end of the stem accordingly cyclically impacts, under these conditions, against the soil. Once the injector stem has thus been driven into the ground, it is pulled upwardly a slight distance to give clearance space therebelow, and the sonic injection process then carried out substantially as described above.

The invention has been described in the foregoing in connection with a cement slurry as the injected material. It will be understood that any of the materials preliminarily mentioned, or still others, may be used in the practice of the invention. Loose or unconsolidated sand was mentioned as a material that may be injected to form a sand body for purpose of soil drainage. The sand may be injected in a wet state or slurry. However, some sands are quite fluent in the dry state, and may be injected dry. When sand is injected for soil drainage, as in marshy country, the injected sand body draws water from its surrounding wet soil, and this water is removed by pumping from within the implanted sand body.

FIGS. 4 to 9 show a more advanced design of sonic injector basically similar to that already described, but incorporating certain additional advantageous features.

The steel or other elastic injector stem 75 has secured to its upper end, as by studs 76, the bottom-flanged body 77 of a sonic vibration or wave generator 78. Secured to the top of body 77 is the flanged base 79 of an upstanding stem 80, which is surrounded by airspring sleeve 81. The upper end of sleeve 81 has an internal flange 82 which seats on the upper end of stem 80, and which is engaged by an external flange 83 on check valve cup 84, the members 80, 82 and 83 being secured together by screws 85. Stem 81 has an intermediate enlargement affording upper and lower stop shoulders 87 and 88, respectively, and provided with an annular flange 89 to which is bolted air spring piston 90. The latter has an annular edge portion 90a carrying a piston ring 91 slidingly fitting the interior surface of a ring-shaped wall 92 fitted between the opposed peripheries of air-spring-chamber top and bottom walls 93 and 94, respectively. Bottom air-spring-chamber wall 94 has a hub portion 94a slidingly fitting and pressure sealed to stem 81, and top wall 93 has a hub portion 93a slidingly fitting and pressure sealed to stem 81.

Air under pressure is fed to the chamber of the air spring through ports 92a and 92b (FIG. 7) located in chamber side wall 92 above and below, respectively, the normally operating position range of the piston, as shown. These intake ports 92a and 92b are fed through air fitting 95 secured in any suitable way to wall 92, and supplied with air under pressure through an air hose 95a connected to the nipple of fitting 95. Air bleed ports 96 in wall 92 control the position of the piston 90. With no pressure air in the air spring chamber, the piston 90 and stem 81, as well as all parts suspended from the latter, are lowered from the position shown with stem shoulder 88 seating on the upper end of chamber hub 94a. As pressure air is then fed via ports 92a and 92b to the chamber spaces above and below piston 90, the pressure under the piston rises, while that above the piston does not materially rise at first owing to the leakage through ports 96. The piston 90 and parts supported therefrom are finally elevated by the pressure so built up below the piston, until piston ring 91 closes bleed ports 96. Thereafter, the pressure above the piston rises, until the piston reaches an automatically preserved equilibrium position, such as shown. The stem 81 and all components of the equipment below, which are the vibratory components, are thus air spring supported, and are capable of vertical vibration independently of the air spring chamber and components of the equipment above, through which the equipment is suspended.

Mounted on air spring hub portion 93a is a cap 100 having a bore 101 slidingly receiving the upper portion of the aforementioned check valve cup 84, packing being used, as at 102. The bore 101 is intersected by horizontal bore 103 extending through cap 100, and to opposite ends of which are coupled the upper ends of a pair of pipes 104. These pipes curve down to points of connection with the upper ends of passages 105 extending through platforms 106 cast integrally with upper air spring chamber wall 93. To the lower ends of passages 105 are coupled material feed hoses 107.

Stem 75 has a longitudinal materials feed bore 110, which is continued upwardly by a bore 111 in generator body 77, a bore 112 in stem 80, and the aforementioned bore 101 in cap 100.

The lower end of stem 75 is counterbored, as at 113, to receive the mounting flange of a bottom check valve cup 115. The transverse walls of check valve cups 84 and 115 are formed with valve apertures 116, adapted to be closed by valve balls 117. Pins 118 extending across the cup serve to cage the balls 117. Additional such ball check valve assemblies may be used in stem 75 if desired.

The upper end of cap 100 is formed with an eye 119, by which the apparatus may be suspended from conventional hoisting and lowering gear, not shown.

The aforementioned vibration generator body 77 has on opposite sides of bore 111, large cylindrical cavities 120, disposed on parallel horizontal axes, each met on each side by concentric bores 121 of smaller diameter which open through the side of the body 77. Side plates 122 and 123 secured as by screws 124 to the sides of body 77 have portions entering bores 121 and serving to form the side walls of the cavities 120, as clearly shown in FIG. 6. A pin or axle 126 projects from each side plate 122, coaxially with cavity 120, and is tightly set into an aperture 127 in the opposed side plate 123. An inertia ring 128 encircles each pin 126, its inside diameter being substantially larger than the outside diameter of the pin, as shown.

Pneumatic means are provided for spinning the rings 128, as will next be described.

Mounted on each of the two generator side plates 122 is a hollow air intake case 136 having a half-round side wall portion 137, merging above and below with full-round wall portions 138 and 139, respectively. The circular openings through the latter are closed by upper and lower cover plates 140 and 140a, and a bushing 141 is inserted in wall portion 139. A tubular air inlet fitting member 142 has a piston 143 working in circular wall portion 138, and a smaller piston 144 working in bushing 141. This tubular member 142 has air outlet ports 145 between pistons 143 and 144, and an air intake nipple 146 connected to air supply hose 146a. Lower cover plate 140a has an opening to pass nipple 146, and affords a support shoulder underlying piston 144. Upper piston 143 has a bleed port 147, and wall portion 138 has a bleed port 148. When air under pressure is introduced via hose 146a and discharges through ports 145 into casing 136, the air pressure in the latter exerts an upward force on the piston combination because of the greater area of the upper piston 143, and the pistons tend to rise, as to the position of FIG. 8. Air at this time leaks out via port 147, the space above piston 144, and port 148, permitting the pistons to rise. When, however, the piston 143 closes the port 148, air is thereafter compressed in the chamber space above piston 143. The hose and the inlet fitting 142 are thus air-supported, and not subject to the full vibration of the surrounding equipment.

Air thus fed to the interior of casing 136 flows via ports 149 to cavity 120, being received in an annular channel 150 sunk in the adjacent side face of inertia ring 128, and flows thence through a plurality of grooves 152 formed in said side face and extending from channel 150 through the outer periphery of the ring 128. The grooves 152 are cut tangentially to the channel 150, so that jets of air are discharged from the periphery of the ring with components of velocity tangential of the ring. The inertia ring is accordingly driven so as to gyrate on the axle 126, spinning on the latter by a rolling action. Since the ring fits the axle with substantial clearance, it, or its center of gravity, is always eccentric to the axle, and because of the resulting unbalance, exerts a centrifugal force on the axle.

The two rings 128 have their grooves 129 cut at opposite angles, so that they spin in opposite directions. The air pressure driving the rings is adjusted to spin the rings at a resonant frequency of the stem, and the rings synchronize with one another and cooperate to set up a longitudinal standing wave in the stem in a manner exactly as described in connection with the embodiment of FIGS. 1–3. Air is exhausted from cavities 120 through ports 153.

The embodiment of FIGS. 4–9 has a further feature that may also be used in connection with the embodiment of FIGS. 1–3. A plurality of bores or grooves 160 are formed in the body of stem 75, in this case in its periphery, opening through the lower end of the stem. These bores or grooves receive steel reinforcing rods 161, which go in with the stem, but are left in the hole as the stem is withdrawn to reinforce the cement, concrete or other body formed in the hole. As here shown, the rods 161 are interconnected at the bottom by a flanged ring or pan 162 to which they are welded. The pan assembly goes readily into the hole ahead of the stem, but sticks in the hole, so as to hold the rods in their intended position, when the stem is elevated.

It is sometimes desirable to bias the stem in a downward direction, particularly when the stem is to drive itself into the ground, and to this end, biasing masses indicated in dot dash lines at M may be loaded on platforms 106.

In FIGS. 10 and 11, showing another embodiment, numeral 210 designates generally a bore which has been drilled into the earth. Suspended in this bore is an elastic wave transmitting column 211, the lower end 211a of which functions as a sonic wave radiator. In the present illustrative embodiment of the invention, this column 211 is made up of a string of fairly heavy pipe 212, such as oil well drill pipe, stands of which are coupled to one another as at 212a by means of conventional joints, together with a long steel vibratory rod or stem member 213, coupled to the lower end of the string of pipe 212. The rod or stem may be about 80 feet in length, and of a diameter of 8 inches for a bore hole diameter of 8⅝ inches. The lower end 211a of the stem 213 comprises a wave radiator or coupling element. To improve coupling, and to perform a materials pumping function, a conventional swab cup 214 may be mounted on the lower end of rod 213 (see FIG. 11). This cup, whose inner portion is reinforced by wire convolutions 215, is mounted on rod 213 between nut 216 and sleeve 217, with its somewhat flexible lip portion in sliding engagement with the walls of the well. The function of this cup will be more particularly described hereinafter.

The column 211 is suspended in the bore hole from ground surface equipment, including a vibration or sonic wave generator, one illustrative example of which will now be described. A beam 220 is pivoted at one end, as at 221, on a suitable support 222 rising from an earth supported platform or foundation 223 placed around casing head 239, the central portion of beam 220 being apertured, as at 224, to pass the jointed pipe string or column, and a suitable releasable clamp means such as indicated at 225, being mounted on and secured to the beam, and being adapted for rigid clamping of the pipe string. This clamp means 225, the details of which need not be illustrated, since they may be conventional, may comprise a slip bowl furnished with wedge slips adapted for tight clamping of the pipe string, or it may comprise a split collar adapted to be tightened about the pipe string, or may consist of any other suitable device for tightly clamping the pipe string to the beam. A means for releasably holding the clamp means down to the beam is indicated at 226.

The beam carries, at its free end, a vibration or sonic wave generator 230 designed to produce a vertically directed alternating force. The generator, beam and column are yieldingly supported by compression springs 231 under the free end of the beam and supported on foundation 223. Generator 230 comprises, illustratively, two unbalanced weights 232 on parallel shafts which are connected by spur gears 233, one of the shafts being belt driven from gasoline engine 235. This engine is preferably a torque responsive engine, such as an ordinary carburetor type of internal combustion engine. The two weights are arranged so as to move up and down in unison, so that the unbalanced vertical forces which they generate will be additive, and will be transmitted to beam 220, causing it to oscillate, and to exert a vertical alternating force on the upper end of column 211. Since the rotors turn in opposite directions, horizontal force components are cancelled.

The vertically directed alternating force exerted on the upper end of column 211 sends alternating elastic deformation waves of compression and tension down the column to the lower end thereof where the waves are reflected and transmitted back to the top, creating a standing wave in the column. If the frequency of these waves is made such that they arrive back at the top in phase with new waves of like kind being launched down the column, a condition of standing wave resonance is attained. A somewhat idealized wave system is indicated in FIG. 10, wherein a resonant standing wave W is represented conventionally along the side of the column. The distance $a$ in the diagram represents the wave amplitude, which will be seen to vary for different positions along the column. Nodes of the standing wave, where amplitude is minimized, or zero, are indicated at N. Velocity antinodes, where wave amplitude is maximized, are indicated by the letter V. It will be understood that the distance between successive velocity antinodes is a half wave length for the wave system in the column. Attention is further drawn to the fact that the velocity antinodes V are further apart for the pipe string portion of the column than they are for the solid rod or stem 213. In an embodiment of the invention wherein the column is of uniform cross-section from end to end, the velocity antinodes would, of course, be equally spaced throughout the length of the column. In the illustrative system shown, stem 213 vibrates in a half wave length resonant longitudinal standing wave mode. This is accomplished when the wave generator is driven by engine 235 at a frequency which is a fundamental resonant frequency for the length and cross-sectional area of the stem 213. In operation, the engine throttle is set to obtain such resonance, which is manifested to the operator by high vibration amplitude. It should be understood that it is not an essential for half wave length standing wave operation of the rod 213 that a resonant standing wave be established throughout the remainder of the column. Thus, a wave consisting of alternating waves of compression and tension transmitted down the pipe string 212 will exert an alternating force on the upper end of the stem 213 and will set the latter into resonant longitudinal standing wave action if at the resonant frequency of the stem 213.

A great deal of vibratory energy is stored in the column 211 whether or not resonant standing wave performance is established. It is of course true that vibration amplitude is maximized in the region of the antinodes, under conditions of resonant standing wave operation, and it is generally desirable that, when using the illustrative embodiment of the invention, including the solid stem 213, operation be at a frequency approximating or falling within the resonant range for the stem 213. It is further advantageous to have the entire column operating under conditions of resonant standing wave performance, as diagrammed in FIG. 10, but such ideal performance is not generally essential. In event of the use of a column or stem of uniform cross-section from end to end, however, standing wave resonance for the entirety thereof is easily attained by adjustment of the operating frequency of the generator, it being a simple matter to adjust the frequency of operation to whatever length of column or stem is suspended at any given time in the well bore.

The material to be injected, e.g., liquid containing loose sand, or freshly mixed concrete, etc., is introduced via a pipe line 238 connected into casing head 239 and sent downwardly in the annulus defined partly by the column and partly by the wall of bore 210. In the region of the enlarged rod or stem 213, the material is in guided contact with the vibratory stem. A feed pump, such as indicated at P, enables operation at a pressure above that owing to hydrostatic pressure, if such should be desired. The injected material is indicated at C in FIG. 11. In operation, considering stem 213 to vibrate in a half wave length standing wave mode, the two half length portions of the stem 213 alternately elastically elongate and contract, this occurring at the resonant operating frequency. It will be evident that the lower wave radiating end 211a of the rod will under such conditions move through a relatively short stroke, but with great force, and therefore with great output impedance. More broadly under any type of longitudinal elastic deformation wave action in the column, the lower end thereof 211a will vibrate at the operating frequency through a relatively short displacement distance but with great force, thereby yielding high output impedance, as desired.

The flexible cup or collar 214 expands on each down stroke of the vibrating stem 213 into sealing contact with the walls of the bore hole, and thus at once seals against downward passage of material C, and, by closing off the leakage path up the bore hole, improves the acoustic coupling to the material C below the cup. Material C is pumped or displaced downwardly by the cup on each down stroke. On each upstroke, the cup contracts, and passes a quantity of the material C between it and the wall of the bore hole. This material is pumped downwardly on the succeeding downstroke, as will be seen. It will also be seen that with material C filling the bore hole below the stem 213, sonic waves are radiated from the stem and transmitted through the material C to the surrounding earth material, and are thence transmitted through the surrounding earth material. The earth material is thereby subjected to sonic impacting by the injected material. It becomes fluidized, compacted, and penetrated to a substantial extent by the injected material, freshly mixed concrete in this case.

The wave generator 230, being located entirely above ground, can readily be constructed to a scale yielding high alternating output force, and it is a feature that the eccentric weights 232 are designed to produce high unbalanced force, so that high power waves are established in the column. The column is also designed to be relatively heavy and to have a high allowable stress range, so as to accommodate wave amplitudes adequate to result in waves in the formation of such stress as will exceed the resistance to penetration of the formation by the injected material.

The body of material (e.g., wet concrete) in the bore hole, in contact with the wave radiation surface 211a on the lower end of the column, is under high hydrostatic pressure. The pressure wave radiated into the coupling material from the radiator and transmitted therethrough will be seen to be superimposed on the maintained mean hydrostatic pressure. By having the mean hydrostatic pressure relatively high, the amplitude of the acoustic waves transmitted through the material to the walls of the bore hole is established at a correspondingly high level. The impedance of the coupling material is also a factor of interest. Using a material such as concrete, the acoustic impedance, while not as high as the output impedance of the wave radiator, or the impedance of the formation itself, is still comparatively high. Moreover, the impedance of the material is elevated by reason of the high hydrostatic pressure, which tends to increase the density of the fluid. Further, the impedance of the material can be further increased by incorporating therein a greater proportion of granular solid material, such as sand.

Under the conditions described, a powerful acoustic wave action is set up in and propagated through the earthen material, an amplitude exceeding the endurance limit of the formation, i.e., capable of shattering rock formation, being readily attained. Desired penetration of the formation proceeds rapidly under these conditions.

Also, under the high power level acoustic waves transmitted through injected material in liquid form, liquid cavitation and other non-linear, transient or asymmetric wave effects, including steep front shock waves, are attainable. These effects are conducive to wave peaking, whereby the pressure amplitude corresponding to the endurance limit of the formation may be periodically instantaneously exceeded by a relatively great amount.

An advantageous feature of the present system is that its underground operation may be detected by simply watching the vibratory behavior of the upper end of the pipe string, the oscillating beam, and wave generator. Under conditions of resonance, these parts will oscillate at a maximized amplitude, as may easily be observed. When the system is "loaded," i.e., coupled to the formation and working on unfractured formation, it operates at relatively high "Q." That is to say, the energy storage per half cycle is large relative ot the energy dissipated per half cycle. The system "tunes" sharply, and is sensitive to engine speed. When the material penetrates the earth, large frictional energy dissipation occurs, and the Q of the system falls greatly. The two principal manifestations at the ground surface are that vibration amplitude falls, and the system is much less sensitive to engine speed, in that its tuning becomes considerably broader.

In injecting a given zone of substantial vertical dimension, the pipe string may be progressively raised, removing stands of pipe as required, using conventional derrick equipment. In doing this throughout a considerable vertical interval, some attention may in some cases have to be paid to adjustment of generator frequency to preserve resonance. This may be done by throttling the engine. However, the torque responsive characteristics of a carburetor engine tend to make this regulation automatic. In general, the engine, at fixed throttle, varies its speed in response to the torque demand placed on it. When the engine is driving a load constituting a resonant vibrating member, it experiences an increased torque at the resonant frequency, which holds the engine at a corresponding speed. If resonance frequency falls, the torque peaks at a lower engine speed, and the engine speed lowers accordingly. In the case of a large stem 213 such as here illustrated, caused to vibrate at its own resonant frequency by waves travelling down the pipe string 212, adjustment of frequency, once resonance in member 213 has been established, will in general not be required. In the event that a uniform column should be employed, and that it should be desired to maintain standing wave resonance therein as the column is lengthened, the frequency of the generator may be changed, by changing the speed of engine 235, so as to preserve resonance. Or, with a torque responsive engine, this may occur automatically. In many cases speed regulation of the engine will not be required, or will not occur to any great extent, however, since the changed length is often a small percentage of the total length, and operation will not depart very much from the peak of the resonant curve. It is also true, of course, that while resonance is always desirable, and gives optimized performance, it is not always absolutely essential to successful operation; and in many cases, if the system is set up and driven at fixed frequency to attain resonance, and the pipe string is then shortened or lengthened, so that the resonant frequency of the column length as a whole is changed, the system will still operate successfully even without frequency adjustment.

Note may also be made of the fact that when the equipment has been lowered to a relatively great depth, and the fundamental resonant frequency is correspondingly low, the prime mover may often advantageously be speeded up to find and operate at higher harmonic frequency.

It is desired to caution against confusion of the distributed constant or standing wave mode of vibration of the column or stem used in the practice of the invention as distinguished from other common modes of vibration. Thus the vibratory column or stem described herein does not vibrate bodily, i.e., as a whole, but by elastic deformation within itself, according to its distributed constants of mass and elasticity, modified in some cases by an extent of "lumped" mass owing, for example, to concentration of mass at the oscillator. Such a distributed constant system has a resonant frequency of its own, uninfluenced by any features of its environment. The resonant behavior of such a column or stem does not depend, for example, upon the elasticity of the earth, or other media, upon which one of its ends may rest, such that a type of "bouncing" resonance is attained, with the mass of the bodily vibrating column cooperating with the elasticity of the earth to establish a resonant type of vibration. To reiterate, the preferred practice of the invention is characterized by a distributed constant or standing wave mode of elastic vibration within the column or stem mounting the oscillator, with resonance determined solely by selection of a vibration drive frequency corresponding to that for standing wave resonance of the column or stem.

Several illustrative embodiments or examples of the invention have now been described. It will be understood that these are merely for illustrative purposes, and that various changes in design, structure and arrangement may be made within the scope of the invention.

This application is a continuation-in-part of my earlier co-pending applications Serial No. 437,078, filed June 16, 1954, now Patent No. 2,871,943, and Serial No. 787,252, filed January 16, 1959, now Patent No. 3,016,095.

I claim:

1. Apparatus for injection of fluent, body-forming material into a predetermined region in the earth through a hole leading from the ground surface, comprising: a tubular elastic stem adapted for passage into said hole, said stem having a materials feed bore therethrough, a sonic vibration generator acoustically coupled to said stem for generating an elastic wave pattern in said stem, a materials conduit connected to said feed bore of said stem at a position spaced above the lower end of the stem, and there being longitudinal ways in said stem spaced radially outward of said feed bore in said stem, and opening through the lower end of the stem, for accommodation of reinforcing rods.

2. The method of forming a body of material capable of supporting structural load at a predetermined region of relatively low strength in the earth, comprising: introducing an elastic stem longitudinally into the earth to said region, creating continuous sonic elastic vibrations in and along said stem, whereby said stem acts as a radiator of sonic waves into fluent media in contact therewith, and simultaneously therewith introducing to said region, in a fluent state, and in a stream in contact with the elastically vibrating stem, a material which subsequently hardens into a stiff state to form said body, whereby said material is driven into and against the earth material by sonic waves radiated from said stem.

3. The process of claim 2, including the further step of progressively withdrawing the stem from the earth during the introduction of said material.

4. The method of forming a body of material capable of supporting structural load at a predetermined region of relatively low strength in the earth, comprising: introducing a tubular, elastic, material-guiding stem longitudinally into the earth to said region, creating continuous sonic elastic vibrations in and along said stem, whereby said stem acts as a radiator of sonic waves into fluent media in contact therewith, and simultaneously therewith introducing to said region, in a fluent state, and through said elastically vibrating stem in fluid coupling contact with at least a portion of the latter, a material which subsequently hardens into a stiff state to form said body, with said material driven into and against the earth material by sonic waves radiated into the material from said stem.

5. The method of forming a body of material capable of supporting structural load at a predetermined region of relatively low strength in the earth, comprising: forming a bore in the earth leading to said region, introducing into said bore an elastic, material-guiding stem, creating continuous sonic elastic vibrations in and along said stem, whereby said stem acts as a radiator of sonic waves into fluent media in contact therewith, and simultaneously therewith causing material in a fluent state, but which subsequently hardens into a stiff state, to flow to said region in contact with and guided by and between the outside of said stem and the wall of said bore, whereby said material is driven into and against the earth material by sonic waves radiated from said stem to form said body.

6. The method of forming a body of material capable of supporting structural load at a predetermined region of relatively low strength in the earth, comprising: introducing an elastic, material-guiding stem longitudinally into the earth to said region, creating continuous longitudinally oriented sonic elastic vibrations in and along said stem, whereby the lower end of said stem acts as a radiator of sonic waves into fluent media in contact therewith, and simultaneously therewith introducing to said region, in a fluent state, and in a stream in guided contact with the elastically vibrating stem, including said lower end thereof, a material which subsequently hardens into a stiff state to form said body, whereby said material is driven into and against the earth material by sonic waves radiated from said lower end of said stem.

7. The method of forming a body of material capable of supporting structural load at a predetermined region of relatively low strength in the earth, comprising: engaging the lower end of an elastic tubular stem against the earth over said region, creating continuous longitudinally oriented sonic elastic vibrations in said stem from end to end thereof, in such manner that the lower end of said stem acts as a radiator of sonic waves, and simultaneously therewith exerting a biasing force on said stem in a direction to aid penetration into the earth, whereby said stem penetrates into the earth to said predetermined region, terminating the exertion of said biasing force on said stem, but continuing said sonic elastic vibrations therein, and introducing to said region, in a fluent state, and through said elastically vibrating stem a material which subsequently hardens into a stiff state to form said body, all in such manner that the lower end of said stem then radiates said sonic waves into the ejected body-forming fluent material then in coupling contact with the lower end of said stem.

References Cited in the file of this patent

UNITED STATES PATENTS

| | | |
|---|---|---|
| 1,629,622 | Hiley | May 24, 1927 |
| 1,634,231 | Hiley | June 28, 1927 |
| 1,730,337 | Bellocq | Oct. 1, 1929 |
| 2,072,982 | Dale | Mar. 9, 1937 |
| 2,148,722 | Baily | Feb. 28, 1939 |
| 2,667,932 | Bodine | Feb. 2, 1954 |
| 2,915,122 | Hulse | Dec. 1, 1959 |